H. GJERDRUM.
NON-SKID DEVICE.
APPLICATION FILED SEPT. 12, 1919.
1,357,198.
Patented Oct. 26, 1920.
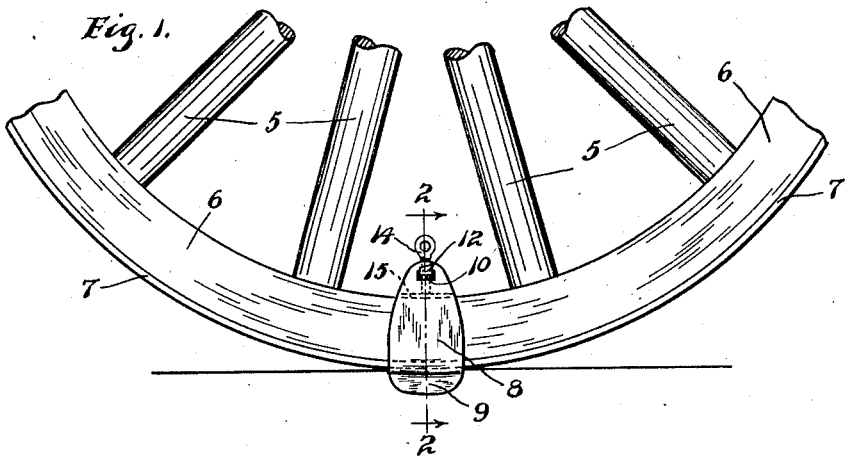
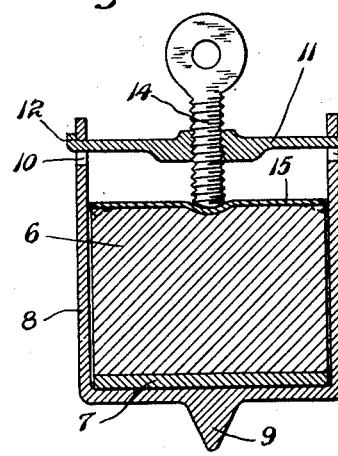
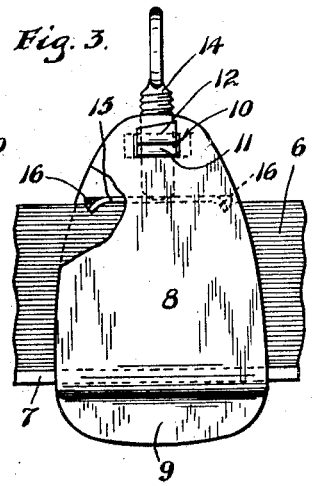
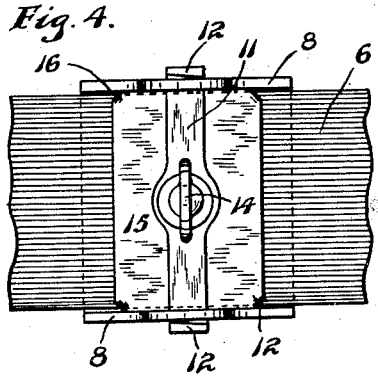
INVENTOR.
HANS GJERDRUM.
BY HIS ATTORNEYS.

UNITED STATES PATENT OFFICE.

HANS GJERDRUM, OF OSLO, MINNESOTA.

NON-SKID DEVICE.

1,357,198.  Specification of Letters Patent.  Patented Oct. 26, 1920.

Application filed September 12, 1919.  Serial No. 323,337.

*To all whom it may concern:*

Be it known that I, HANS GJERDRUM, a citizen of the United States, residing at Oslo, in the county of Marshall and State of Minnesota, have invented certain new and useful Improvements in Non-Skid Devices; and I do hereby declare the following to be a full, clear, and exact description of the invention, such as will enable others skilled in the art to which it appertains to make and use the same.

My invention has for its object to provide an extremely simple and highly efficient non-skid lug for vehicle wheels; and to such ends, generally stated, the invention consists of the novel construction and combination of parts hereinafter described and defined in the claim.

A non-skid lug, so-called, may be applied to various different kinds of vehicle wheels, but is especially designed for application to ordinary wagon wheels, and the purpose thereof is to prevent skidding or side slipping of the wagon on slippery roads, such as ice or ice-coated roads. The lugs may be applied to the wheels in any desired number, but in the drawings, only one lug is shown as applied to a wheel.

The improved lug, in its preferred form, is illustrated in the accompanying drawings, wherein like characters indicate like parts throughout the several views.

Referring to the drawings:—

Figure 1 is a side elevation showing a portion of a wagon wheel and showing one of my improved lugs applied thereto;

Fig. 2 is an enlarged section on the line 2—2 of Fig. 1;

Fig. 3 is a side elevation with some parts broken away showing one of the improved lugs and a portion of the wheel felly; and Fig. 4 is a plan view of a clamp and that portion of the felly that is shown in Fig. 3.

Of the parts of the wagon wheel, the numeral 5 indicates the spokes, the numeral 6 the felly, the numeral 7 the tire thereof, said parts being of the usual or any suitable construction.

The improved lug, as its main body element, comprises a rectangular metal yoke 8 having flat prongs that are spaced so that they quite closely engage the sides of the tire 7 and felly 6 and are projected inward of the felly. The bottom or outer plate of the yoke 8 is formed with a quite sharp or approximately V-shaped rib 9 that extends circumferentially of the wheel and will prevent side skidding of the wheel and will also, in case of setting of the brakes on a wagon wheel, prevent slipping of the wheel either forward or rearward on an icy road.

The side prongs of the yoke 8 are formed with rectangular perforations 10 through which the ends of a clamping bar 11 are adapted to be passed. The extreme ends of this clamping bar are in the form of laterally projecting lugs 12 that are preferably beveled slightly so that they will draw the side prongs or plates of the yoke 8 against the felly when said bar 11 is forced away from the felly. These ends 12 are adapted to be passed through the notches 10, into and out of interlocking engagement with the ends of the prongs.

At its intermediate portion, the bar 11 is thickened and is provided with a clamping screw 14 that works therethrough with threaded engagement.

The numeral 15 indicates a clamping plate, preferably of approximately rectangular form and of a length to fit freely between the prongs of the yoke 8 and to engage the inner face of the felly 6. The four corners 16 of the plate 15 are bent to form clenching points that will be pressed slightly into the felly to positively prevent slipping of the device on the wheel felly.

To apply the yoke to the wheel, or to remove the same therefrom, the ends of the bar 11 must first be passed through the notches 10 and then into interlocking engagement with the said prongs. The parts being positioned, as shown and as described, and the screw 14 being tightened, the yoke will be very securely held to position on the wheel, and will perform the above noted function of an anti-skidding device and traction lug.

The device may be very easily applied to a wheel or removed therefrom, and of course, may be applied in any desired number.

What I claim is:

A non-skid device for vehicle wheels having approximately rectangular fellies and hard tires, comprising an approximately rectangular U-shaped yoke having on its outer cross web a projecting rib that extends approximately parallel to its sides, a clamping bar detachably engageable with the inner ends of the sides of said yoke and having projecting stop lugs immediately outward thereof, a clamping screw working with threaded engagement through the intermediate portion of said clamping bar, and a clamping plate adapted to be pressed against the inner surface of the wheel felly by said clamping screw, the said clamping bar being held interlocked to the sides of said yoke by pressure from said screw and positively preventing spreading of the sides of the said yoke.

In testimony whereof I affix my signature in presence of two witnesses.

HANS GJERDRUM.

Witnesses:
O. A. SMITH,
G. H. GUNDERSON.